US009088722B2

(12) United States Patent
Ito et al.

(10) Patent No.: US 9,088,722 B2
(45) Date of Patent: Jul. 21, 2015

(54) IMAGE PROCESSING METHOD, COMPUTER-READABLE RECORDING MEDIUM, AND IMAGE PROCESSING APPARATUS

(71) Applicant: OLYMPUS IMAGING CORP., Shibuya-ku, Tokyo (JP)

(72) Inventors: Kensei Ito, Sagamihara (JP); Maki Toida, Tokyo (JP); Izumi Sakuma, Musashino (JP)

(73) Assignee: OLYMPUS IMAGING CORP. (JP)

( * ) Notice: Subject to any disclaimer, the term of this patent is extended or adjusted under 35 U.S.C. 154(b) by 57 days.

(21) Appl. No.: 13/962,365

(22) Filed: Aug. 8, 2013

(65) Prior Publication Data

US 2014/0043504 A1 Feb. 13, 2014

(30) Foreign Application Priority Data

Aug. 10, 2012 (JP) ................ 2012-178889

(51) Int. Cl.
*H04N 5/222* (2006.01)
*H04N 5/232* (2006.01)
*H04N 5/262* (2006.01)

(52) U.S. Cl.
CPC ......... *H04N 5/23293* (2013.01); *H04N 5/2624* (2013.01)

(58) Field of Classification Search
CPC .......... H04N 5/23212; H04N 5/23293; H04N 5/2624
USPC ............. 348/333.01–333.05, 333.11, 333.12, 348/239
See application file for complete search history.

(56) References Cited

U.S. PATENT DOCUMENTS

2009/0208062 A1* 8/2009 Sorek et al. .................. 382/107

FOREIGN PATENT DOCUMENTS

JP 2004-215157 A 7/2004

* cited by examiner

*Primary Examiner* — Yogesh Aggarwal
(74) *Attorney, Agent, or Firm* — Volpe and Koenig, P.C.

(57) ABSTRACT

An image processing method includes generating a composite image of a selected image and sub-images. The selected image is an image selected from a plurality of images obtained by shooting a subject. The sub-images are images other than the selected image selected from the plurality of images. The sub-images are distinguishable from the selected image.

21 Claims, 15 Drawing Sheets

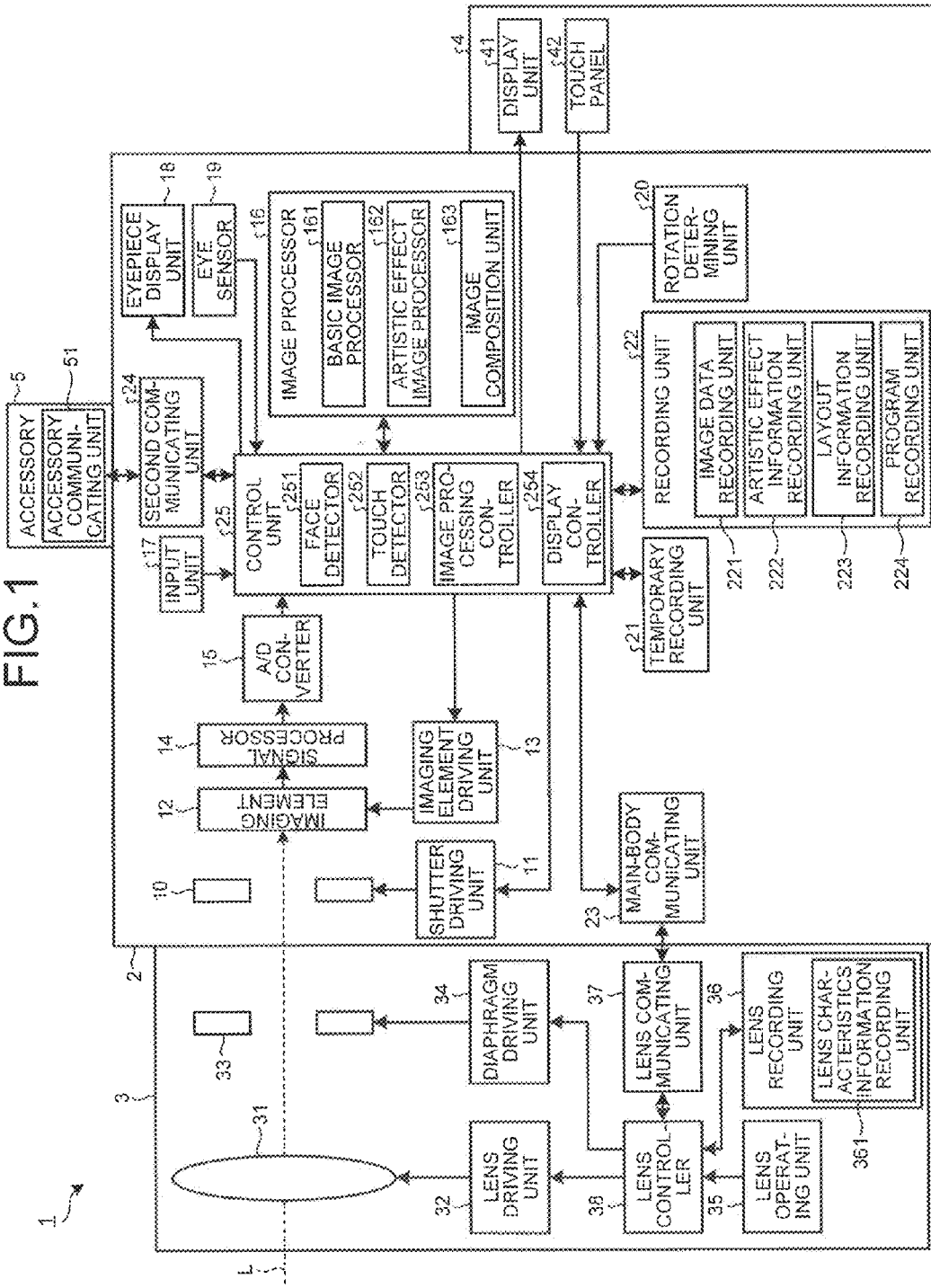

FIG.2

| NAME | SATURA-TION | GAMMA | VISUAL EFFECT |
|---|---|---|---|
| FANTASIC FOCUS | NORMAL | GAMMA FOR INCREASING INTERMEDIATE LUMINANCE | SOFT FOCUS |
| FANTASIC FOCUS + STARLIGHT | NORMAL | GAMMA FOR INCREASING INTERMEDIATE LUMINANCE | SOFT FOCUS + CROSS FILTER |
| FANTASIC FOCUS + WHITE EDGE | NORMAL | GAMMA FOR INCREASING INTERMEDIATE LUMINANCE | SOFT FOCUS + INCREASE LUMINANCE OF PERIPHERY |
| POP ART | HIGH SATURA-TION | GAMMA FOR ENHANCING CONTRAST | NO |
| POP ART + STARLIGHT | HIGH SATURA-TION | GAMMA FOR ENHANCING CONTRAST | CROSS FILTER |
| POP ART + PINHOLE | HIGH SATURA-TION | GAMMA FOR ENHANCING CONTRAST | SHADING |
| POP ART + WHITE EDGE | HIGH SATURA-TION | GAMMA FOR ENHANCING CONTRAST | INCREASE LUMINANCE OF PERIPHERY |
| TOY PHOTO | NORMAL | NORMAL | SHADING |
| ROUGH MONOCHROME | MONO-CHROME | GAMMA FOR ENHANCING CONTRAST | ADD NOISE |
| DIORAMA | HIGH SATURA-TION | GAMMA FOR ENHANCING CONTRAST | BLUR PERIPHERY |

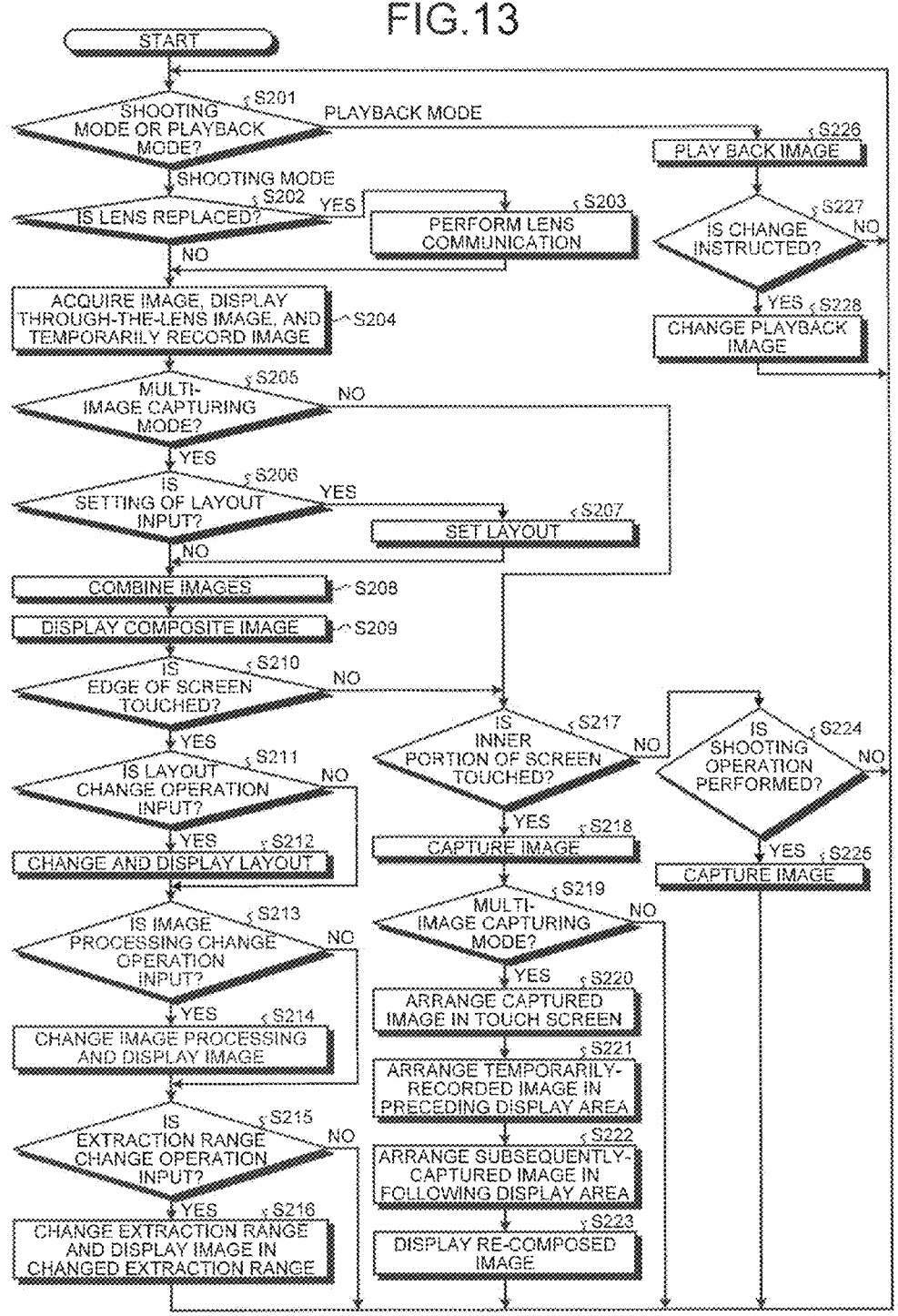

IMAGE PROCESSING METHOD, COMPUTER-READABLE RECORDING MEDIUM, AND IMAGE PROCESSING APPARATUS

CROSS REFERENCE TO RELATED APPLICATION

This application is based upon and claims the benefit of priority from Japanese Patent Application No. 2012-178889, filed on Aug. 10, 2012, the entire contents of which are incorporated herein by reference.

FIELD OF THE INVENTION

The disclosure relates to an image processing method, a computer-readable recording medium, and an image processing apparatus.

BACKGROUND

An imaging apparatus captures an image of a subject and generates image data indicative of the subject. It is well known that when such an imaging apparatus captures images of an object in a series of patterns, a plurality of guide images based on a plurality of pieces of guide image data corresponding to a series of sample images are simultaneously displayed on a screen. Because the guide images are simultaneously displayed on the screen, an imaging procedure can be set easily and a plurality of images can be captured efficiently.

The image processing apparatus and method described herein solves a need in the art for simultaneously displaying a selected image and at least one other image, that is distinguishable from the selected image, on a display as a composite image.

SUMMARY

An image processing method, a computer-readable recording medium, and an image processing apparatus are presented.

An apparatus for processing an image is provided that includes an imaging unit that captures a plurality of images of a subject and generates a composite image. The composite image includes a selected image and at least one sub-image of the subject. The at least one sub-image is different than the selected image.

An image processing method is provided that includes generating a composite image comprised of a selected image and at least one sub-image. The selected image is selected from a plurality of images obtained by shooting a subject. The at least one sub-image is selected from the plurality of images other than the selected image. The at least one sub-image is distinguishable from the selected image.

BRIEF DESCRIPTION OF THE DRAWINGS

The following detailed description will be better understood when read in conjunction with the appended drawings, which illustrate preferred embodiments of the invention. In the drawings:

FIG. 1 is a block diagram illustrating an exemplary configuration of an exemplary imaging apparatus according to a first embodiment of the present invention.

FIG. 2 is a table illustrating an exemplary outline of artistic effect image processing performed by an artistic effect image processor.

FIG. 13 is a flowchart of processes performed by an imaging apparatus according to a second embodiment of the present invention.

DETAILED DESCRIPTION OF THE PREFERRED EMBODIMENTS

Figure 3:
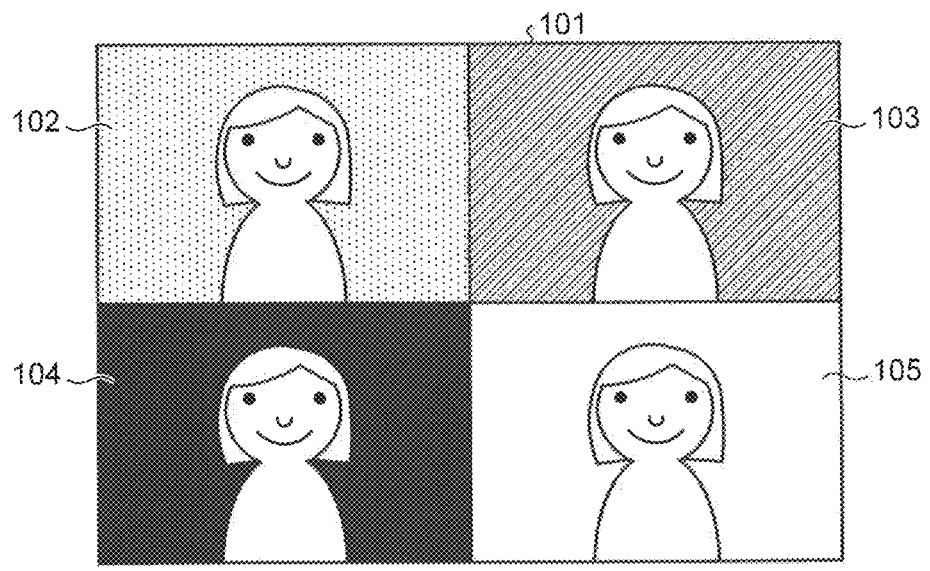
FIG. 3 illustrates a display example of a composite image generated by an image composition unit.

In some embodiments herein, an image processing method includes generating a composite image of a selected image and at least one sub-image. The selected image is an image selected from a plurality of images obtained by shooting a subject. The at least one sub-image is distinguishable from the selected image.

In some embodiments herein, a non-transitory computer-readable recording medium on which an executable program is recorded is provided. The program instructs a processor to perform: generating a composite image of a selected image and at least one sub-image, the selected image being an image selected from a plurality of images obtained by shooting a subject, and the at least one sub-image being an image other than the selected image among the plurality of images and being distinguishable from the selected image.

In some embodiments, an image processing apparatus includes an image composition unit configured to generate a composite image of a selected image and at least one sub-image. The selected image is an image selected from a plurality of images obtained by shooting a subject. The at least one sub-image is an image other than the selected image among the plurality of images and is distinguishable from the selected image.

Exemplary embodiments of the present invention will be described below with reference to the accompanying drawings.

FIG. 1 is a block diagram illustrating a preferable configuration of an imaging apparatus 1 according to a first embodiment of the present invention. As used herein, an imaging apparatus includes any device that captures an image such as, without limitation, a camera, digital camera, video camera, and virtual camera, camera phone, smart phone, tablet computer, computing device, digital media player, television, gaming console, portable electronic device, scanner, medical imaging device, industrial imaging equipment, or other device that generates processable image data.

The imaging apparatus 1 preferably includes a main body 2, a lens unit 3 that can be removably attached to the main body 2 or combined with or built-in to the main body 2, and a monitor 4 that can be movably connected to the main body 2 or fixed to the main body. An accessory 5 can also be removably attached to the main body 2 of the imaging apparatus 1.

The main body 2 preferably includes a shutter 10, a shutter driving unit 11, an imaging element 12, an imaging element driving unit 13, a signal processor 14, an A/D converter 15, an image processor 16, an input unit 17, an eyepiece display unit 18, an eye sensor 19, a rotation determining unit 20, a temporary recording unit 21, a recording unit 22, a main-body communicating unit 23, a second communicating unit 24, and a control unit 25.

The shutter 10 sets the state of the imaging element 12 to an exposed state or a light-shielded state. The shutter driving unit 11 preferably includes a stepping motor, and drives the shutter 10 in response to an instruction signal input by the control unit 25.

The imaging element 12 includes a CCD (Charge Coupled Device), a CMOS (Complementary Metal Oxide Semiconductor), or other image sensor that receives light collected by the lens unit 3 and converts the light into an electrical signal.

The imaging element 12 has at least a part of the functions of an imaging unit that captures a subject and generates image data of the subject.

The imaging element driving unit 13 causes the imaging element 12 to output image data (such as an analog signal) to the signal processor 14 at a specified timing. In this regard, the imaging element driving unit 13 functions as an electronic shutter.

The signal processor 14 performs analog processing, such as noise reduction processing and gain-up processing, on the analog signal input by the imaging element 12, and outputs the processed analog signal to the A/D converter 15.

The A/D converter 15 performs A/D conversion on the analog signal input by the signal processor 14 to thereby generate digital image data, and outputs the digital image data to the control unit 25.

The image processor 16 performs specified image processing on the image data generated by the imaging element 12. The image processor 16 preferably includes a basic image processor 161, an artistic effect image processor 162, and an image composition unit 163.

The basic image processor 161 performs basic image processing on image data, which includes, without limitation, optical black subtraction processing, white balance (WB) adjustment processing, color matrix calculation processing, gamma correction processing, color reproduction processing, and edge enhancement processing on image data. The basic image processor 161 can also perform finish effect processing for reproducing a natural image based on preset parameters of each image processing, to thereby generate finish effect image data. Examples of the parameters of each image processing preferably include, without limitation, a contrast value, a sharpness value, a saturation value, a white balance value, and a gradation value.

The artistic effect image processor 162 performs artistic effect image processing for producing a visual effect by combining a plurality of types of image processing on a single piece of image data, to thereby generate processed image data (hereinafter referred to as "artistic effect image data").

FIG. 2 is a diagram illustrating an outline of the artistic effect image processing performed by the artistic effect image processor 162. Exemplary types of processing are illustrated in FIG. 2 as the artistic effect image processing as follows: fantasic focus; fantasic focus+starlight; fantasic focus+white edge; pop art; pop art+starlight; pop art+pinhole; pop art+white edge; toy photo; rough monochrome; and diorama. It is understood that other types of artistic effect image processing can be performed by the artistic effect image processor 162 without departing from the scope of the present invention.

The fantasic focus is a process for performing fading processing on an entire image and combining the faded image with a non-faded image at a specified ratio in order to apply a soft focus effect ("fantasic focus" is an understood Japanese term). In the fantasic focus, tone curve processing for increasing intermediate luminance is performed, so that an image with a beautiful and fantasic atmosphere surrounded by a pleasant light is formed or generated while maintaining details of a subject in soft tone. For example, the fantasic focus is realized by combining a plurality of types of image processing such as, without limitation, tone curve processing, fading processing, alpha blending processing, and image composition processing.

The fantasic focus+starlight is a process for applying a cross filter effect to draw a cross pattern in a high-luminance part of an image, in addition to the fantasic focus.

The fantasic focus+white edge is a process for applying an effect for gradually increasing white tone from the center of an image to the edge of the image, in addition to the fantasic focus. The white tone effect can be obtained by changing pixel values such that the peripheral part of the image becomes whiter as a distance from the center of the image increases.

The pop art is a process for intensifying colors to make an image colorful to render a bright and pleasant atmosphere. For example, the pop art is produced by combining saturation enhancement processing and contrast enhancement processing to create an overall high contrast and high saturation effect.

The pop art+starlight is a process for applying the pop art and the starlight in a superimposed manner. In this process, an effect in which a cross filter is applied to a colorful image is obtained.

The pop art+pinhole is a process for performing a toy photo (pinhole) that darkens the edge of an image by shading to give an effect of looking through a hole, in addition to the pop art. Details of the toy photo are discussed in more detail below.

The pop art+white edge is a process for applying the pop art and the white edge in a superimposed manner.

The toy photo is a process for decreasing (darkening) the luminance with an increase in the distance from the center of an image to give an effect of straying into a different dimension when looking through a hole. For example, the toy photo is realized by combining image processing, such as a shading process for multiplying a luminance signal by a coefficient whose value decrease as it is closer to a peripheral part, in addition to low-pass filter processing, white balance processing, contrast processing, hue/saturation processing. Details of the toy photo and shading process are more fully explained in Japanese Laid-open Patent Publication No. 2010-74244, which is incorporated by reference as if fully set forth herein.

The rough monochrome is a process for adding a high contrast and a film-grain noise to render a dynamic or rough monochrome image. For example, the rough monochrome is realized by combining edge enhancement processing, level correction optimization processing, noise pattern superimposition processing, composition processing, contrast processing, and the like. Details of the rough monochrome are more fully explained in Japanese Laid-open Patent Publication No. 2010-62836, which is incorporated by reference as if fully set forth herein. The noise pattern superimposition processing (noise addition processing) is a process for adding a pre-generated noise pattern image to an original image. For example, a random number may be generated and used to generate the noise pattern image.

The diorama is a process for fading the edge of an image having a high contrast and a high saturation in order to generate an atmosphere that causes a user to feel as if he/she is looking at a miniature model or a toy. For example, the diorama is realized by combining, without limitation, hue/saturation processing, contrast processing, peripheral fading processing, composition processing, and the like. In the peripheral fading processing, low-pass filter processing is performed while changing a low pass filter coefficient depending on positions on an image such that the degree of fading becomes higher as the distance from the center of the image increases. In the peripheral fading processing, only top and bottom parts of an image or only right and left parts of an image may be faded.

The image composition unit 163 combines a plurality of artistic effect images which are obtained by performing different types of artistic effect image processing from one another by the artistic effect image processor 162. FIG. 3 illustrates a display example of a composite image 101 generated by the image composition unit 163. The composite image 101 illustrated in FIG. 3 is an image obtained by combining four sub-images 102 to 105. The sub-images 102 to 104 are generated by performing three different types of artistic effect image processing on one piece of image data. A sub-image 105 is an image (a captured image) that is not subjected to artistic effect image processing. The artistic effects of the composite images shown in the drawings are schematically illustrated.

Figure 4:
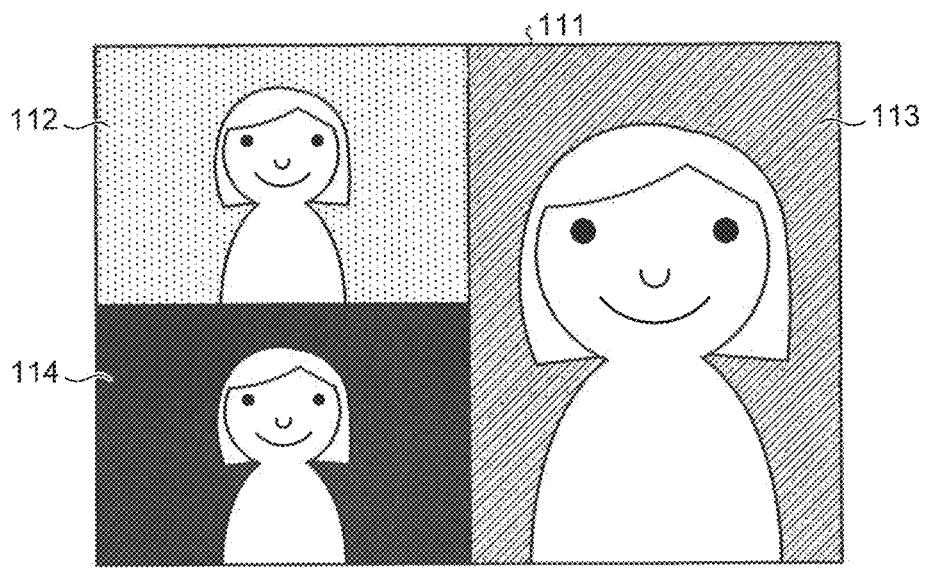
FIG. 4 illustrates a second display example of the composite image generated by the image composition unit.

FIG. 4 illustrates another display example (the second example) of a composite image 111 generated by the image composition unit 163. The composite image 111 illustrated in FIG. 4 is an image obtained by combining one main image 113 and two sub-images 112 and 114. The main image 113 occupies a right half of the composite image 111. The sub-images 112 and 114 have equal sizes each being a half of a left half of the composite image 111 along the vertical direction and smaller than the main image 113.

Figure 5:
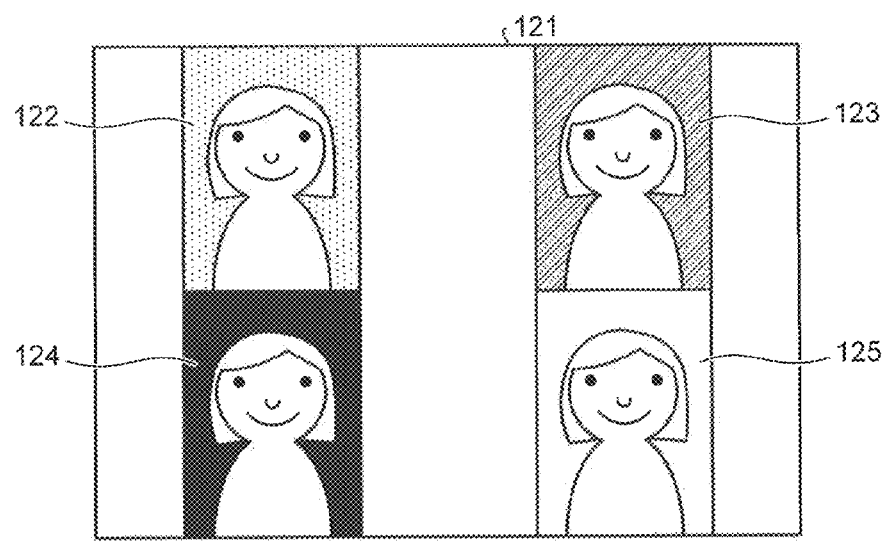
FIG. 5 illustrates a third display example of the composite image generated by the image composition unit.

FIG. 5 illustrates another display example (the third example) of a composite image 121 generated by the image composition unit 163. The composite image 121 illustrated in FIG. 5 is an image obtained by combining four sub-images 122 to 125. The sub-images 122 to 125 are vertically long images with the same sizes. The sub-images 122 to 124 are generated by performing three different types of artistic effect image processing on one piece of image data. The sub-image 125 is an image that is not subjected to the artistic effect image processing.

Figure 6:
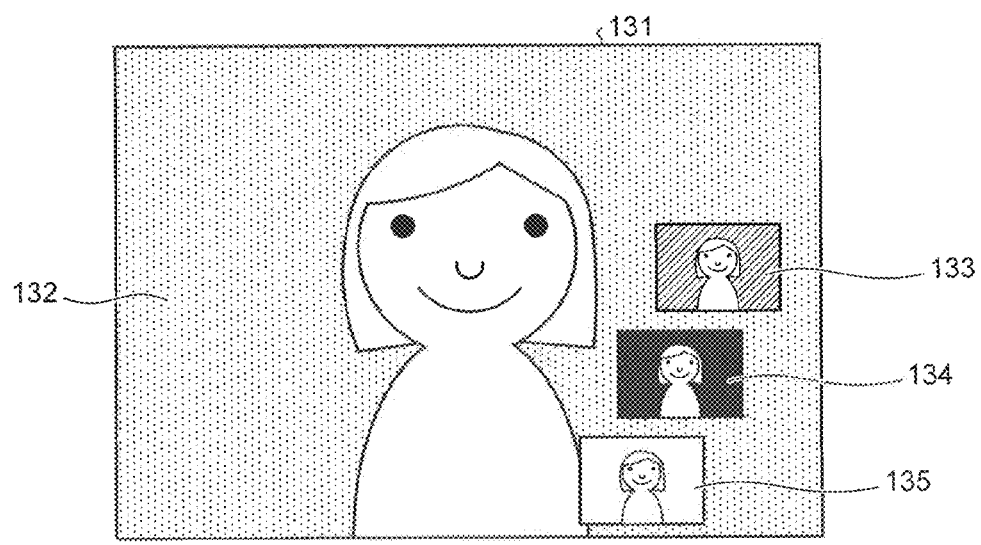
FIG. 6 illustrates a fourth display example of the composite image generated by the image composition unit.

FIG. 6 illustrates another display example (the fourth example) of a composite image 131 generated by the image composition unit 163. In the composite image 131 illustrated in FIG. 6, three sub-images 133 to 135 are superimposed on one main image 132 with the same size as a screen. The main image 132 and the sub-images 133 and 134 are generated by performing three different types of artistic effect image processing on one piece of image data. The sub-image 135 is an image that is not subjected to artistic effect image processing. The display positions of the sub-images 133 to 135 can be changed appropriately.

Referring again to FIG. 1, the input unit 17 of the imaging apparatus 1 includes an operation signal input user interface that includes a release button for receiving an input of an imaging signal when a still image is captured, a mode switching button for receiving an input of a switching instruction signal to instruct the imaging apparatus 1 to switch a mode, and a moving image button for receiving a signal for giving instructions to start and stop shooting of a moving image.

The eyepiece display unit 18 is preferably an electronic viewfinder (EVF). The eyepiece display unit 18 can display the composite images 101, 111, 121, and 131 illustrated in FIG. 3 to FIG. 6.

The eye sensor 19 is preferably provided near the eyepiece display unit 18, and detects whether a human eye is brought close to the eyepiece display unit 18.

The rotation determining unit 20 determines whether the monitor 4 is separated by rotation from the main body 2.

The temporary recording unit 21 temporarily stores therein image data input by the A/D converter 15, image data input by the image processor 16 after the image processing, and information being processed by the imaging apparatus 1. The temporary recording unit 21 includes a volatile memory.

The recording unit 22 includes a nonvolatile memory, and includes an image data recording unit 221, an artistic effect information recording unit 222, a layout information recording unit 223, and a program recording unit 224.

The image data recording unit 221 records image data including image data generated by the imaging element 12. The artistic effect information recording unit 222 records a combination of various types of image processing for each type of artistic effect image processing performed by the artistic effect image processor 162.

The layout information recording unit 223 records layout information on the composite images (see, for example, FIG. 3 to FIG. 6) generated by the image composition unit 163.

The program recording unit 224 records various programs for operating the imaging apparatus 1, an imaging program, various types of data used during execution of the programs, various parameters needed for operations of the image processing performed by the image processor 16, and the like.

The functions of the recording unit 22 may be realized by using a computer-readable storage medium such as a detachable memory card.

The main-body communicating unit 23 is a communication interface for performing communication with the lens unit 3 which is preferably mounted on the main body 2 of the imaging apparatus 1. The main-body communicating unit 23 includes an electrical contact with the lens unit 3. The lens unit 3 can also be combined with or built into the imaging apparatus 1.

The second communicating unit 24 is an interface for performing communication with the accessory 5 which is preferably mounted on the main body 2. The second communicating unit 24 includes an electrical contact with the accessory 5. The accessory 5 includes an accessory communicating unit 51 serving as a communication interface for communication with the main body 2. By way of example only and without limitation, the accessory 5 can be an electronic flash that emits assist light. The accessory 5 can also be combined with or built into the imaging apparatus 1.

The control unit 25 includes a CPU (Central Processing Unit) which preferably includes, without limitation, a face detector 251, a touch detector 252, an image processing controller 253, and a display controller 254. The face detector 251 detects a human face contained in a captured image. The touch detector 252 detects a touched position corresponding to a signal received from a touch panel 42 of the monitor 4 as described herein. The image processing controller 253 controls operations of the image processor 16. The display controller 254 controls display modes of the eyepiece display unit 18 and a display unit 41 of the monitor 4. The display controller 254 utilizes, as a main image, at least one image selected from among a plurality of images obtained by performing different types of image processing by the image processor 16, and utilizes images selected from among the plurality of images, other than the main image, as sub-images. The sub-images preferably have visual features or processing effects that are distinguishable from the main image. The display controller 254 causes the display unit 41 of the monitor 4 to collectively display the main image and the sub-images (a list display). The main image to be selected is not limited to a single image. For example, a user may select two images as main images by touching the images with two fingers. In order for the sub-images to be distinguishable from the main image, for example, the shape of a rim, a contrast, a resolution, a focus, or a color of the sub-images differs from that of the main image. It is preferable to display the main image such that the main image can stand out from the sub-images.

The control unit 25 sets an exposure condition (AE processing) and automatically adjusts a focus of the imaging apparatus 1 (AF processing) based on the image data recorded in the image data recording unit 221 when a still image or a moving image is captured. The control unit 25 integrally controls operations of the imaging apparatus 1 by transmitting a control signal or various types of data to each of the units of the imaging apparatus 1 via a bus.

The control unit 25 controls start of a shooting operation when a shooting operation start signal (operation signal) is input from the input unit 17. The shooting operation preferably includes operations of specified processing performed by the signal processor 14, the A/D converter 15, and the image processor 16 on image data that the imaging element 12 has output by being driven by the shutter driving unit 11 and the imaging element driving unit 13. The image data processed as above is preferably compressed in a specified format under the control of the control unit 25, and is recorded in the recording unit 22. Examples of the specified format include, without limitation, a JPEG (Joint Photographic Experts Group) format, a Motion JPEG format, and an MP4 (H.264) format.

The imaging apparatus may further include a voice input/output unit, an assist light emitting unit that emits assist light (flash) to a subject, and a communicating unit that transmits and receives data to and from an external apparatus via a specified communication network.

The lens unit 3 preferably includes an optical system 31, a lens driving unit 32, a diaphragm 33, a diaphragm driving unit 34, a lens operating unit 35, a lens recording unit 36, a lens communicating unit 37, and a lens controller 38.

The optical system 31 preferably includes one or more lenses. The optical system 31 collects light from a specified field of vision. The optical system 31 preferably has an optical zoom function to change the angle of view and a focus function to change a focus.

The lens driving unit 32 preferably includes a DC motor, a stepping motor, or the like, and moves a lens of the optical system 31 on an optical axis L to thereby change the point of focus or the angle of view of the optical system 31.

The diaphragm 33 adjusts exposure by limiting the amount of incident light collected by the optical system 31.

The diaphragm driving unit 34 includes a stepping motor, and drives the diaphragm 33.

The lens operating unit 35 is, for example, a ring provided on the periphery of a lens barrel of the lens unit 3, and receives an operation signal to start an optical zoom operation by the lens unit 3 or an instruction signal to give instructions to adjust the point of focus of the lens unit 3. The lens operating unit 35 may be, without limitation, a push-type switch or a touch panel.

The lens recording unit 36 preferably includes a lens characteristics information recording unit 361 that records information on the optical characteristics of the optical system 31. The lens recording unit 36 records a control program for determining a position and motion of the optical system 31 and various parameters.

The lens communicating unit 37 is a communication interface for performing communication with the main-body communicating unit 23 of the main body 2 when the lens unit 3 is mounted on the main body 2. The lens communicating unit 37 includes an electrical contact with the main body 2.

The lens controller 38 preferably includes a CPU (Central Processing Unit). The lens controller 38 preferably controls operations of the lens unit 3 according to an operation signal from the lens operating unit 35 or an instruction signal from the main body 2. The lens controller 38 transmits and receives a lens communication signal to and from the control unit 25 of the main body 2 at a specified cycle so as to enable cooperation with the main body 2. Specifically, the lens controller 38 drives the lens driving unit 32 so as to adjust the focus of the lens unit 3 or change the zoom of the lens unit 3 and also drives the diaphragm driving unit 34 so as to change a diaphragm value, in accordance with an operation signal of the lens operating unit 35 contained in the lens communication signal. When the lens unit 3 is mounted on the main body 2, the lens controller 38 transmits, to the main body 2, lens characteristics information, information on the point of focus, a focal distance, and specific information for identifying the lens unit 3.

The monitor 4 includes the display unit 41 and the touch panel 42. The display unit 41 and the touch panel 42 are preferably electrically connected to the main body 2.

The display unit 41 is configured to display an image corresponding to image data, and includes a display panel preferably made of liquid crystal or organic EL (Electro Luminescence). As an image display method, the display unit 41 employs, without limitation, a rec view display which displays image data for a given period of time (for example, three seconds) immediately after shooting, a playback display for playing back image data recorded in the recording unit 22, and a through-the-lens image display (live view display) for sequentially displaying live view images corresponding to pieces of image data successively generated by the imaging element 12 in chronological order like a moving image. In the through-the-lens image display, a user is allowed to capture an image while checking a decisive moment of a subject. In addition, the display unit 41 appropriately displays operation information on the imaging apparatus 1 and information on imaging. The display unit 41 can display the composite images 101, 111, 121, and 131 illustrated in FIG. 3 to FIG. 6, respectively.

The touch panel 42 is preferably disposed on a display screen of the display unit 41, and receives a signal corresponding to a touched position. The touch panel 42 can comprise a low-resistance film system, a capacitance system, or an optical system, without limitation.

Figure 7A:
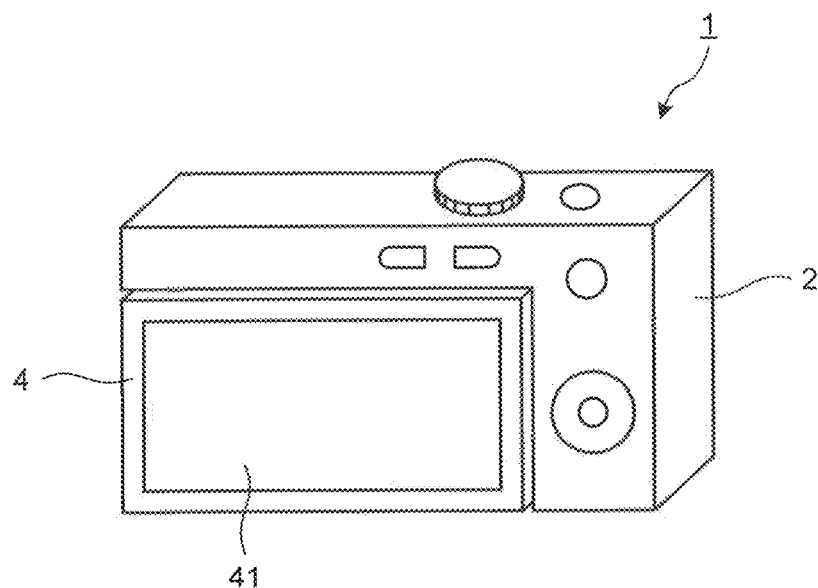
FIG. 7A illustrates a back side of the imaging apparatus when a display screen is parallel to the back face of a main body according to the first embodiment of the present invention.
Figure 7B:
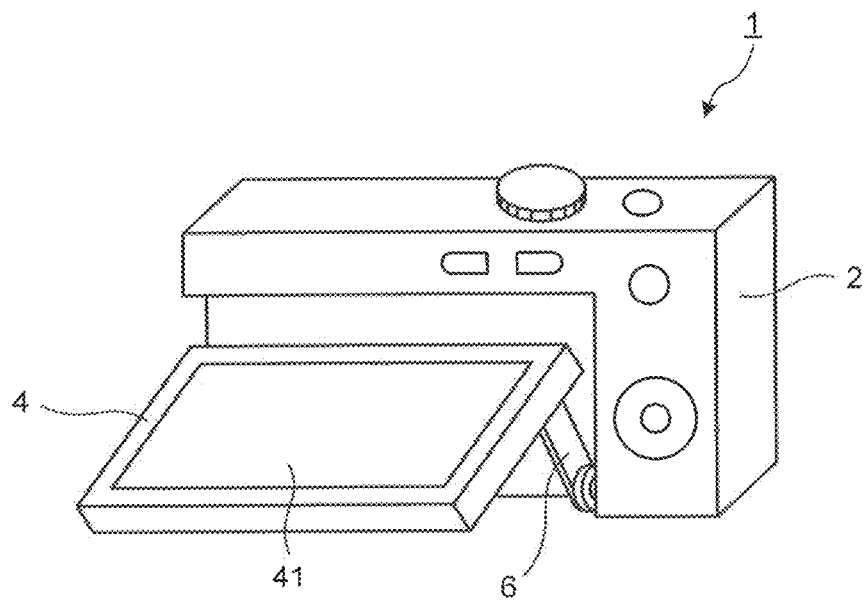
FIG. 7B illustrates the back side of the imaging apparatus when the display screen is tilted with respect to the back face of the main body according to the first embodiment of the present invention.

FIG. 7A and FIG. 7B illustrate a preferred configuration of a back side of the imaging apparatus 1 showing how the monitor 4 can move relative to the main body 2. It is understood the a non-moving monitor is also within the scope of the present invention. A tilt mechanism 6 comprising a hinge and a connection arm preferably connects the monitor 4 to the main body 2. The tilt mechanism 6 can change a tilt angle of the display screen of the display unit 41 with respect to the main body 2. In the state illustrated in FIG. 7A, the display screen of the display unit 41 is parallel to and flush against the back face of the main body 2. In the state illustrated in FIG. 7B, the display screen of the display unit 41 is tilted with respect to the back face of the main body 2. In FIG. 7B, an example is illustrated in which the display screen is tilted upward. However, the display screen of the display unit 41 may be tilted downward or positioned perpendicular to the back face of the main body 2.

The imaging apparatus 1 can set a shooting mode for capturing an image and a playback mode for playing back an image. The shooting mode preferably includes a setting for a multi-image capturing mode, in which a plurality of images obtained by performing different types of image processing on one image can be displayed simultaneously in a desired layout. When the imaging apparatus 1 is in the multi-image capturing mode, the display unit 41 or the eyepiece display unit 18 can display a composite image, such as any of the display forms illustrated in FIG. 3 to FIG. 6, for example. When a user captures an image by the release button or the like, the imaging apparatus 1 captures an image in the form displayed by the display unit 41 or the eyepiece display unit 18 as a captured image, and records the captured image in the recording unit 22.

Figure 8:
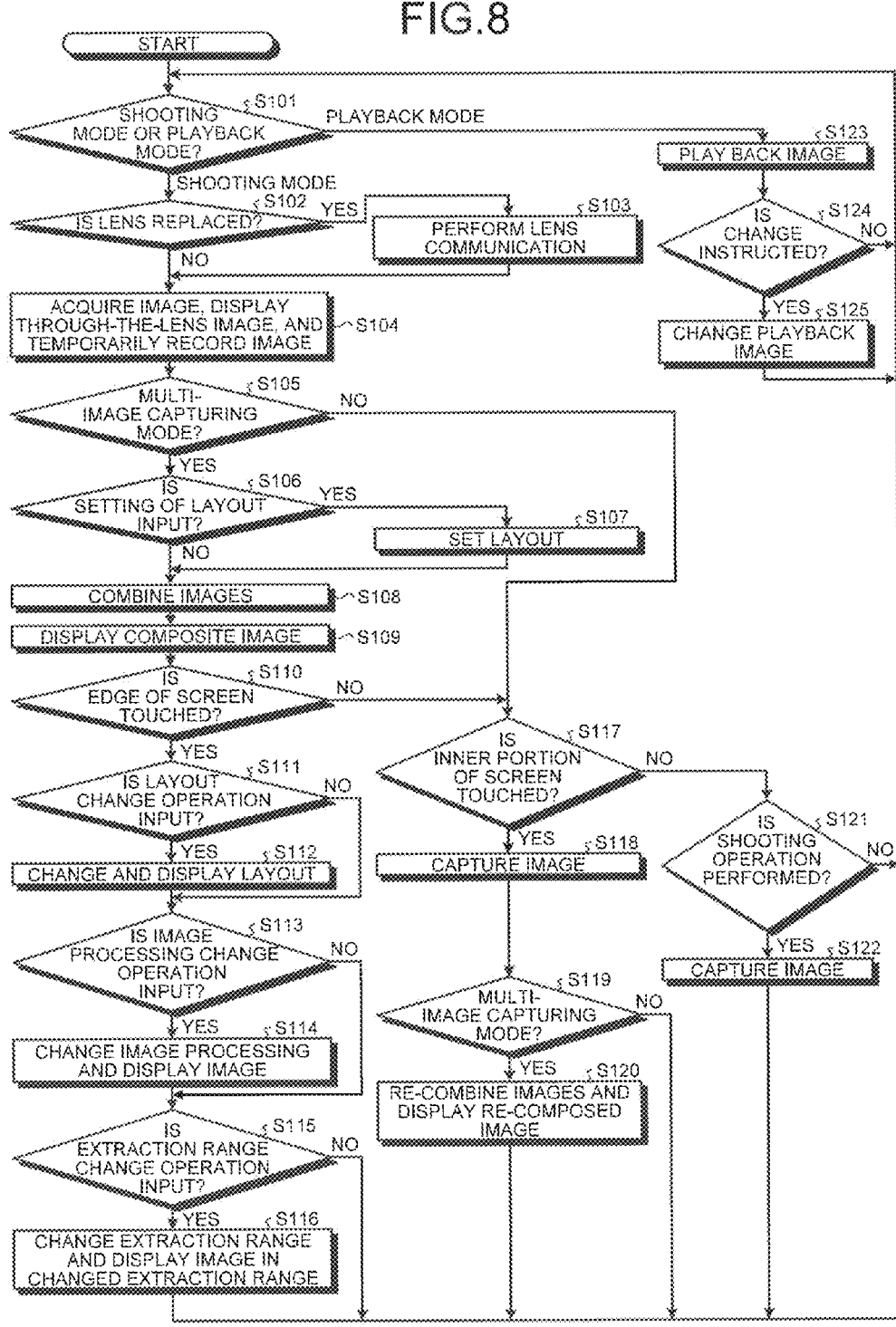
FIG. 8 is a flowchart of processes performed by the imaging apparatus according to the first embodiment of the present invention.

FIG. 8 is an exemplary flowchart of the processes the can be performed by the imaging apparatus 1. The processes described herein may be implemented in any appropriate combination of hardware and/or software. The processes can be factory set on the imaging apparatus 1 or can be downloaded via the Internet and stored on a computer-readable medium associated with the imaging apparatus 1. Similarly, the processes can be downloaded as mobile applications or software applications and stored on a computer-readable medium associated with the imaging apparatus 1.

When the imaging apparatus 1 is in the shooting mode (shooting mode at Step S101) and a lens is replaced (YES at Step S102), the imaging apparatus 1 performs lens communication (Step S103). If the lens is not replaced in the shooting mode (NO at Step S102) or the lens is a built-in lens which is not readily replaced, the imaging apparatus 1 acquires an image, starts the through-the-lens image display, and temporarily records the acquired image in the temporary recording unit 21 (Step S104).

When the imaging apparatus 1 is in the multi-image capturing mode (YES at Step S105) and a signal for setting a layout is input from the input unit 17 (YES at Step S106), the image processing controller 253 transmits layout setting information to the image processor 16 (Step S107). At Step S106, if the signal for setting a layout is not input from the input unit 17 (NO at Step S106), a default set layout or the prior set layout is utilized and the process by the imaging apparatus 1 proceeds to Step S108.

At Step S108, the image composition unit 163 generates a composite image by combining images according to the set layout (Step S108).

After that, the display controller 254 causes the display unit 41 to display the composite image (Step S109). For example and without limitation, the composite image on the display unit 41 can be any one of the composite images 101, 111, 121, and 131 illustrated in FIG. 3 to FIG. 6.

When a portion of the display screen of the display unit 41, such as the edge of the display screen, is touched (YES at Step S110), the imaging apparatus 1 performs processing corresponding to types of the touch (Steps S111 to S116). In the following explanation, examples of the processing corresponding to types of the touch include, but are not limited to, layout change processing, image-processing change processing, and extraction range change processing. While examples of specific touch locations or patterns are described herein as corresponding to specific processing, different touch locations or patterns can be used without departing from the scope of the invention.

When a layout change operation is input (YES at Step S111), the imaging apparatus 1 changes a layout and displays an image in the changed layout on the display unit 41 (Step S112). Specifically, the image processing controller 253 transmits commands for changing the layout to the image composition unit 163, and the image composition unit 163 changes the layout and generates the composite image. Subsequently, the display controller 254 causes the display unit 41 to display the changed composite image.

Figure 9A:
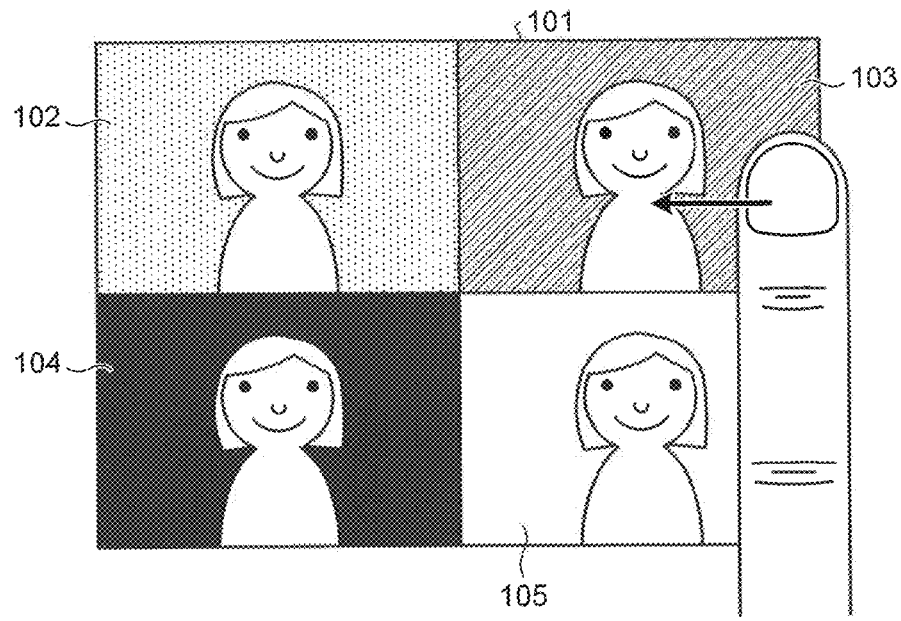
FIG. 9A illustrates a display example before layout change processing is performed by the imaging apparatus according to the first embodiment of the present invention.
Figure 9B:
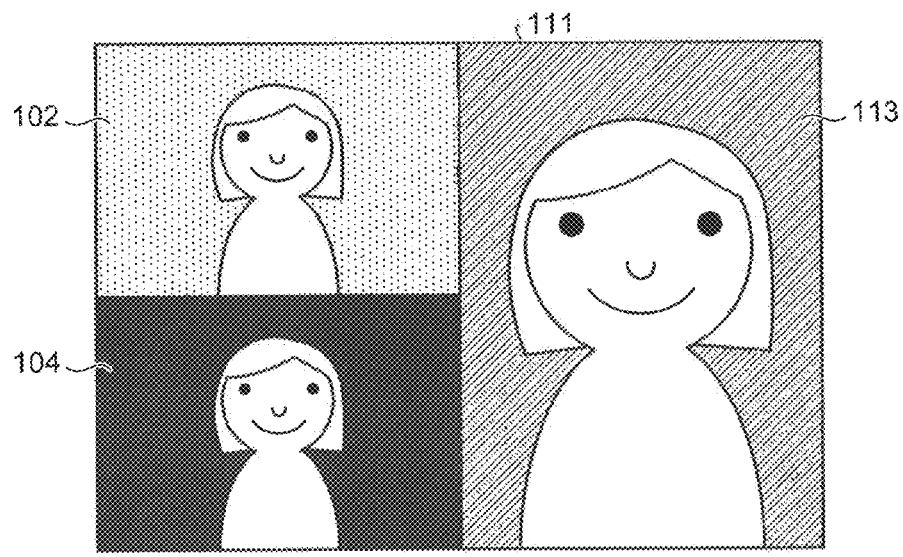
FIG. 9B illustrates a display example after the layout change processing is performed by the imaging apparatus according to the first embodiment of the present invention.

FIG. 9A and FIG. 9B illustrate an example of the layout change processing. For example, when a user touches a portion of the sub-image 103, such as an edge of the sub-image 103, as shown in FIG. 9A while the display unit 41 displays the composite image 101, the touch detector 252 detects this gesture and recognizes the gesture as the layout change processing. Subsequently, the image composition unit 163 generates the composite image 111 in a different layout, for example, such as the layout illustrated in FIG. 9B. In the composite image 111, the sub-image 103 touched by the user in the composite image 101 is displayed in a greater size as the main image 113. It is possible to capture an image after the layout setting processing is performed.

In the first embodiment, the ratio of the layout before the change to the layout after the change is 1:1. For example, when a user touches a portion of the main image 113, such as an edge of the main image 113, while the composite image 111 is being displayed, it is possible to change to a composite image that has the same layout as the composite image 131 illustrated in FIG. 6 and that displays, as a main image, an image subjected to the same artistic effect processing as the main image 113.

If the layout change operation is not input (NO at Step S111 in FIG. 8), the process by the imaging apparatus 1 proceeds to Step S113. When an image-processing change operation is input (YES at Step S113), the imaging apparatus 1 can, for example, change the contents of the processing performed by the artistic effect image processor 162, cause the image composition unit 163 to generate a new composite image, and cause the display unit 41 to display the composite image (Step S114). Examples of the image-processing change operation include touching or swiping on the edge of the display screen of the display unit 41 to change the display pattern of the touched or swiped image.

Figure 10A:
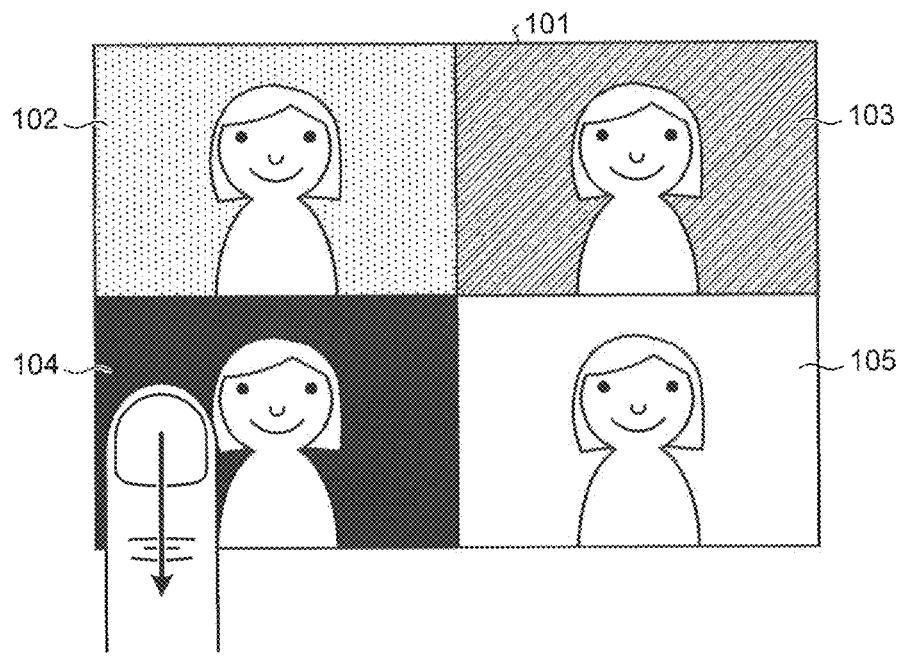
FIG. 10A illustrates a display example before image-processing change processing is performed by the imaging apparatus according to the first embodiment of the present invention.
Figure 10B:
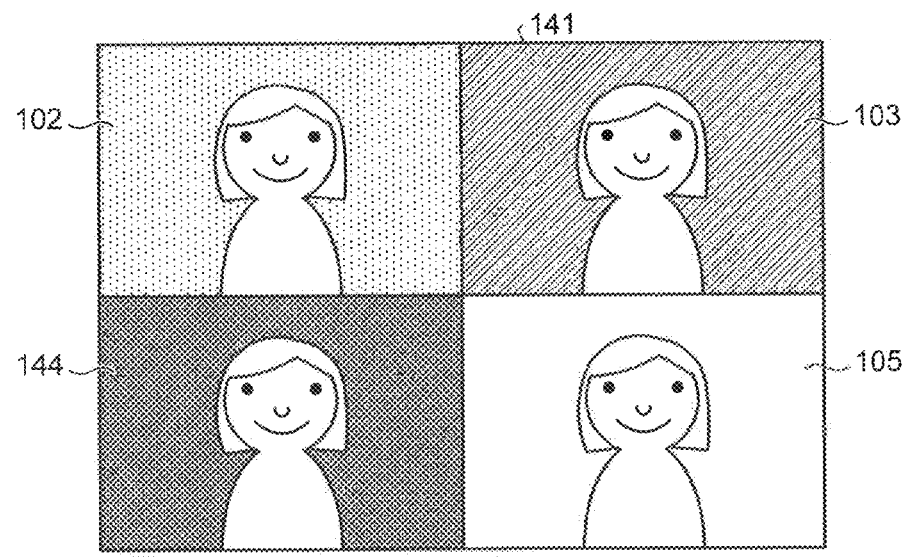
FIG. 10B illustrates a display example after the image-processing change processing is performed by the imaging apparatus according to the first embodiment of the present invention.

FIG. 10A and FIG. 10B illustrate an example of the image-processing change processing. For example, when a user swipes vertically on a portion of the sub-image 104, such as the edge of the sub-image 104, while the display unit 41 displays the composite image 101, such as illustrated in FIG. 10A, the touch detector 252 detects this gesture and recognizes the gesture as the image-processing change processing. Subsequently, the artistic effect image processor 162 changes the artistic effect image processing on the swiped sub-image 104 and performs the changed processing. The artistic effect image processing performed by the artistic effect image processor 162 after swiping may be set in advance or may be selected by a user in each case. Subsequently, the image composition unit 163 re-combines the composite image. FIG. 10B illustrates a display example of a re-composed image wherein in a composite image 141, a sub-image 144 is subjected to a different type of artistic effect image processing from that of the sub-image 104 before change.

If the image-processing change operation is not input (NO at Step S113 in FIG. 8), the process by the imaging apparatus 1 proceeds to Step S115. When an extraction range change operation is input (YES at Step S115), the imaging apparatus 1 causes the image composition unit 163 to generate a composite image corresponding to a newly specified extraction range, and displays the composite image on the display unit 41 (Step S116). Specifically, the image processing controller 253 transmits commands for changing the extraction range to the image composition unit 163, and thereafter, the image composition unit 163 changes the extraction range and generates a composite image. Subsequently, the display controller 254 causes the display unit 41 to display the composite image. After Step S116, the process by the imaging apparatus 1 returns to Step S101.

Figure 11A:
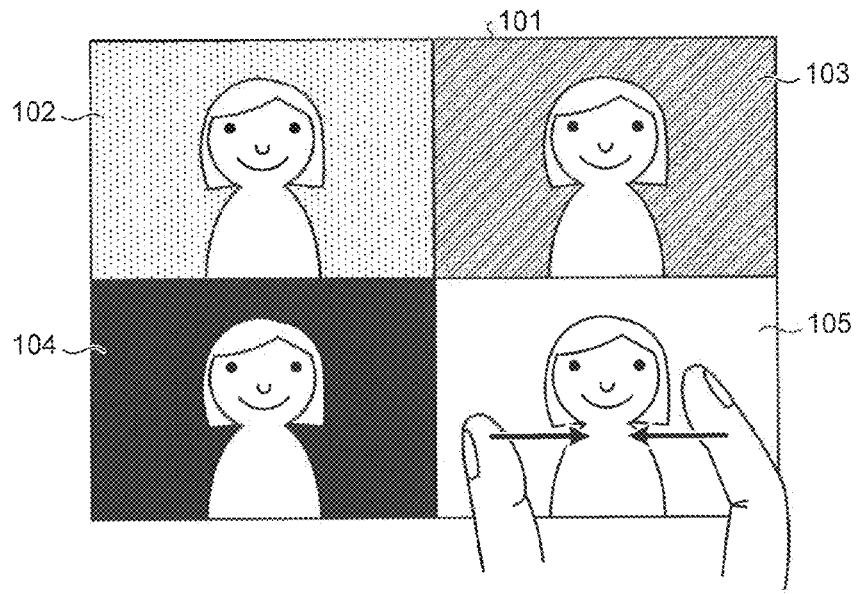
FIG. 11A illustrates a display example before extraction range change processing is performed by the imaging apparatus according to the first embodiment of the present invention.
Figure 11B:
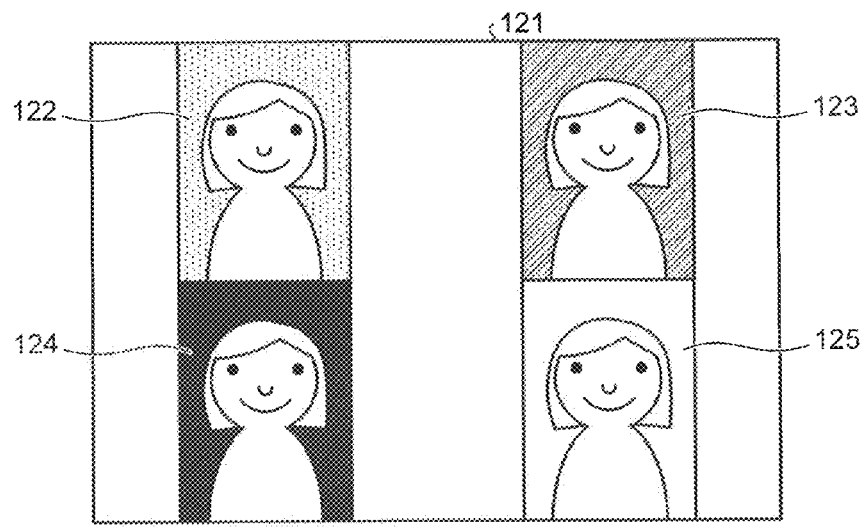
FIG. 11B illustrates a display example after the extraction range change processing is performed by the imaging apparatus according to the first embodiment of the present invention.

FIG. 11A and FIG. 11B illustrate an example of the extraction range change processing. For example, when a user pinches a portion of the sub-image 105, such as the lower end of the sub-image 105, while the display unit 41 displays the composite image 101 as illustrated in FIG. 11A, the touch detector 252 detects this gesture and recognizes the gesture as the extraction range change processing. Subsequently, the image composition unit 163 generates the composite image 121 in the changed extraction range as illustrated in FIG. 11B.

If the extraction range change processing is not input (NO at Step S115 in FIG. 8), the process by the imaging apparatus 1 returns to Step S101.

When a first portion of the display screen, such as the edge of the display screen, of the display unit 41 is not touched at Step S110 (NO at Step S110 in FIG. 8) and a second portion of the display screen, such as an inner portion of the display screen, is touched (YES at Step S117), the imaging apparatus 1 captures an image by adjusting the focus to the touched portion (Step S118). The edge and the inner portion of the display screen described above are appropriately-set areas. For example, the edge may be set to an area with a width of about 1 cm from the outer edge of the display screen and the inner portion of the display screen may be set to an inner area from the edge.

When the imaging apparatus 1 is in the multi-image capturing mode (YES at Step S119 in FIG. 8), the image composition unit 163 re-combines images and the display unit 41 displays a rec view of the re-composed image (Step S120). Thereafter, the process by the imaging apparatus 1 returns to Step S101.

If the inner portion of the display screen is not touched at Step S117 (NO at Step S117 in FIG. 8) and when a shooting operation is performed by a user via the input unit 17 (YES at Step S121), the imaging apparatus 1 captures an image (Step S122). If the shooting operation is not performed by the user via the input unit 17 at Step S121 (NO at Step S121), the process by the imaging apparatus 1 returns to Step S101. After Step S122, the process by the imaging apparatus 1 returns to Step S101.

Figure 12A:
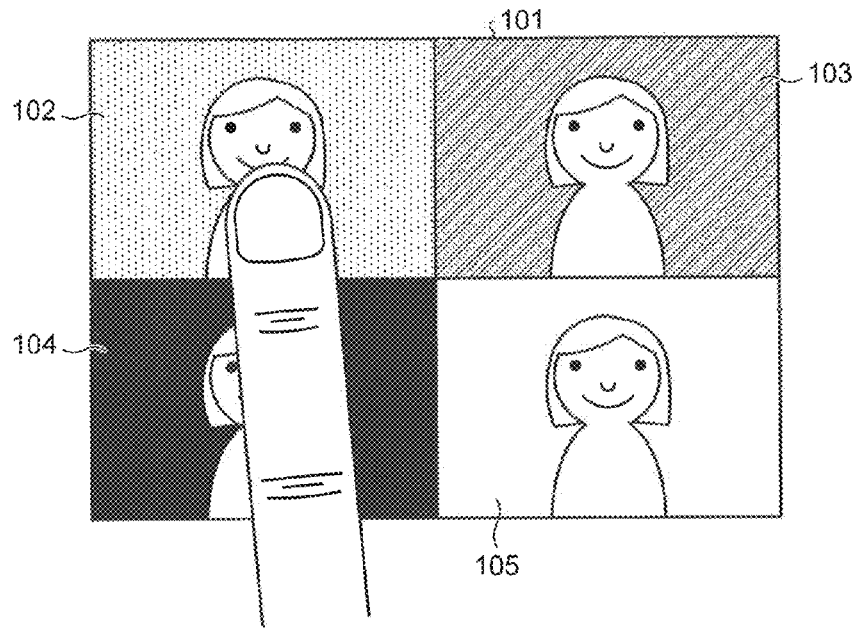
FIG. 12A illustrates a user's touch on a screen of a display unit of the imaging apparatus when an edge of the screen is not touched according to the first embodiment of the present invention.
Figure 12B:
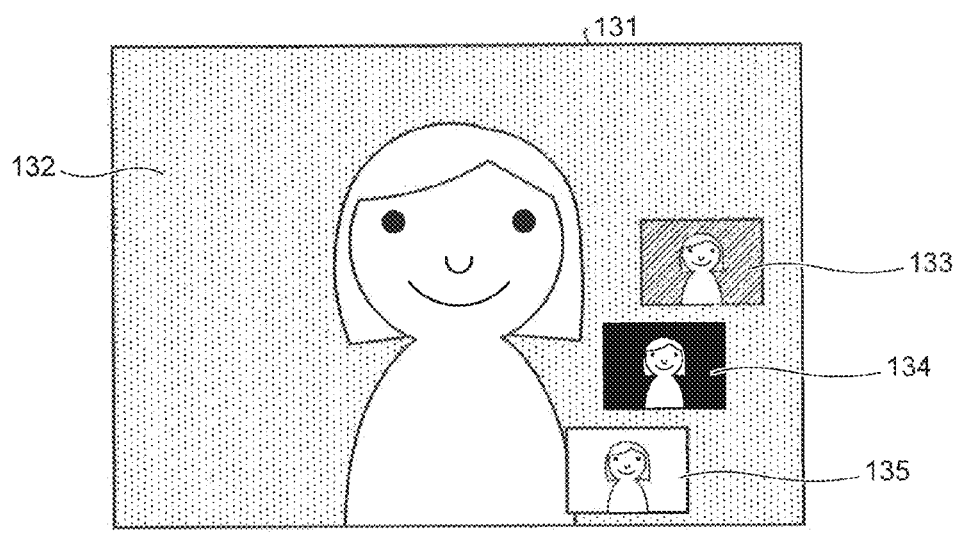
FIG. 12B illustrates a display example of a composite image generated by the image composition unit in response to the user's touch illustrated in FIG. 12A.

FIG. 12A and FIG. 12B illustrate the processes at Step S117 to S120 described above. For example, as illustrated in FIG. 12, when a user touches a center part of the sub-image 102 of the composite image 101, the touch detector 252 detects the touch operation and the control unit 25 controls a shooting operation including adjustment of the focus. Subsequently, the image composition unit 163 generates a new composite image by re-combining the images such that the touched sub-image 102 serves as a main image. FIG. 12B illustrates a display example of the composite image generated by the image composition unit 163. The main image 132 in the composite image 131 illustrated in FIG. 12B is an artistic effect image subjected to the same artistic effect processing as the sub-image 102 touched by the user in the composite image 101. The sub-images 133 to 135 correspond to the sub-images 103 to 105, respectively.

At Step S119, if the imaging apparatus 1 is not in the multi-image capturing mode (NO at Step S119 in FIG. 8), the process by the imaging apparatus 1 returns to Step S101.

If the imaging apparatus 1 is not in the multi-image capturing mode at Step S105 (NO at Step S105 in FIG. 8), the process by the imaging apparatus 1 proceeds to Step S117.

When the imaging apparatus 1 is in the playback mode (playback mode at Step S101 in FIG. 8), the display controller 254 causes the display unit 41 to play back and display a specified image recorded in the recording unit 22 (Step S123).

When commands for changing the play-back-image are input from the input unit 17 (YES at Step S124 in FIG. 8), the display controller 254 causes the display unit 41 to play back and display a different image according to the commands (Step S125). Thereafter, the process by the imaging apparatus 1 returns to Step S101.

If the instructions for changing the play-back-image are not input at Step S124 (NO at Step S124 in FIG. 8), the process by the imaging apparatus 1 returns to Step S101.

According to the first embodiment of the present invention as described above, the main image and the sub-images are collectively displayed on the display unit such that one image selected from among images subjected to different types of image processing by the image processor is employed as the main image and images other than the main image are employed as the sub-images distinguishable from the main image. Therefore, it is possible to obtain a plurality of images desired by a user by a single shooting operation.

Furthermore, according to the first embodiment, the main image can be displayed on the display unit so as to be greater in size than the sub-image. Therefore, a user can obtain a decorated image in which a selected image is located in the center.

In a second embodiment of the present invention, images captured at different times are used as a multi image. A configuration of an imaging apparatus according to the second embodiment is the same as the configuration of the imaging apparatus 1 explained in the first embodiment.

An outline of a process performed by the imaging apparatus 1 according to the second embodiment will be explained below with reference to the exemplary flowchart in FIG. 13. The processing from Steps S201 to S216 in FIG. 13 correspond to Steps S101 to S116 of FIG. 8, respectively.

At Step S217, when a portion of the screen, such as an inner portion of the screen, of the display unit 41 is touched (YES at Step S217), the imaging apparatus 1 captures an image by adjusting the focus to the touched portion (Step S218). If the inner portion of the display screen is not touched at Step S217 (NO at Step S217), Steps S224 and S225 corresponding to steps S121 and S122 of FIG. 8, respectively, are performed.

When the imaging apparatus 1 is in the multi-image capturing mode (YES at Step S219 in FIG. 13), the image captured at Step S218 is arranged at the position touched by the user (Step S220). Subsequently, one or more images captured before the shooting at Step S218 are selected from among images (temporarily-recorded images) temporarily recorded in the temporary recording unit 21 and the selected one or more images are arranged in a "preceding display area" (Step S221). Subsequently, one or more images that are captured after the shooting at Step S218 and that are temporarily recorded in the temporary recording unit 21 are sequentially arranged in a "following display area" (Step S222).

The display controller 254 causes the display unit 41 to display the composite image generated by the image composition unit 163 (Step S223).

Figure 14A:
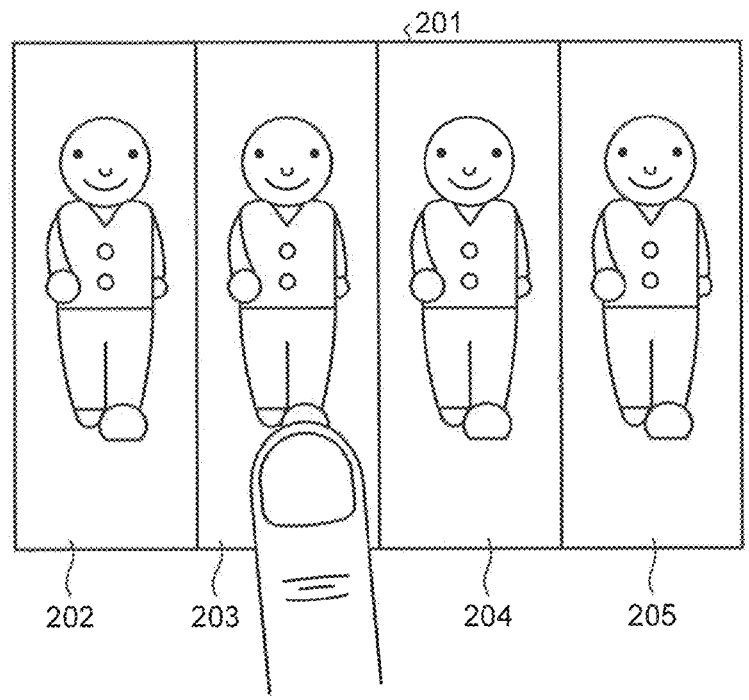
FIG. 14A illustrates a user's touch on a screen of a display unit of the imaging apparatus when an inner portion of the screen is touched according to the second embodiment of the present invention.
Figure 14B:
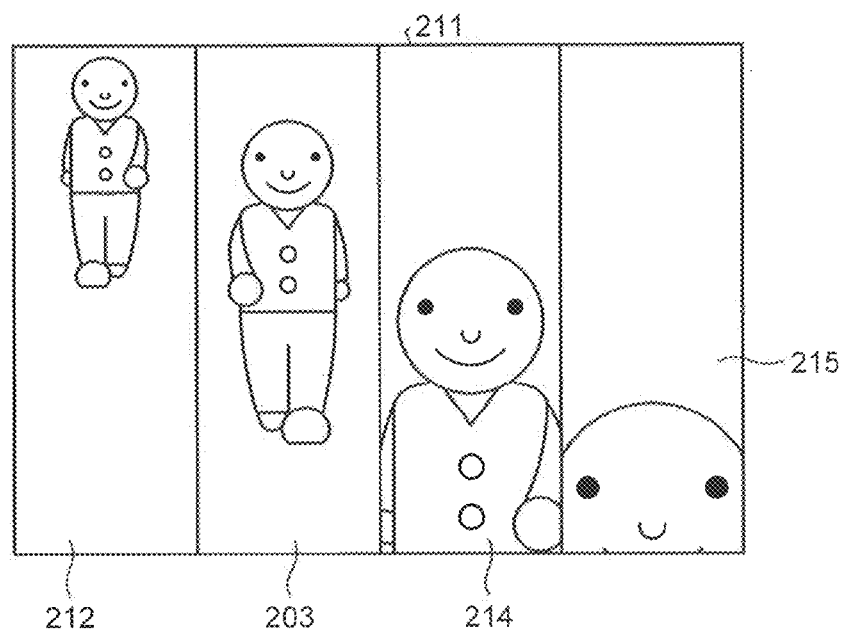
FIG. 14B illustrates a display example of a composite image generated by the image composition unit in response to the user's touch illustrated in FIG. 14A.

FIG. 14A and FIG. 14B are exemplary illustrations of the details of the processes at Steps S217 to S223 described above when the imaging apparatus 1 is in the multi-image capturing mode. A composite image 201 illustrated in FIG. 14A is, for example, a through-the-lens image in which four areas are displayed side by side. Sub-images 202 to 205 render the same image. When the sub-image 203 is touched at Step S217, the image composition unit 163 arranges the captured image in the second area from the left (Step S220).

The captured images are preferably sequentially arranged from left to right in chronological order, and the image composition unit 163 reads, from the temporary recording unit 21, an image captured within a given period of time prior to the shooting at Step S218, and arranges the read image in the left-most area as the preceding display area (Step S221). Subsequently, the image composition unit 163 reads, from the temporary recording unit 21, images sequentially captured at specified intervals after the shooting at Step S218, and sequentially arranges the read images in the third and the fourth areas from the left of the screen as the following display area (Step S222). In this way, the image composition unit 163 generates a composite image 211 as illustrated in FIG. 14B. In the composite image 211, a sub-image 212 is an image captured at the earliest time and a sub-image 215 is an image captured at the latest time. The sub-image 203 that is captured by touching the inner portion of the screen is the main image.

The processes at Steps S224 to S228 in FIG. 13 respectively correspond to Steps S121 to S125 in FIG. 8, respectively.

According to the second embodiment of the present invention as described above, the main image and the sub-images are collectively displayed on the display unit such that one image selected from among images subjected to different types of image processing by the image processor is employed as the main image and images other than the main image are employed as the sub-images that are distinguishable from the main image. Therefore, it is possible to obtain a plurality of images desired by a user by a single shooting operation.

Furthermore, according to the second embodiment, the main image and the sub-images are displayed in chronological order. Therefore, a user can obtain a decorated image including a motion of the subject before and after the selected image.

Figure 15:
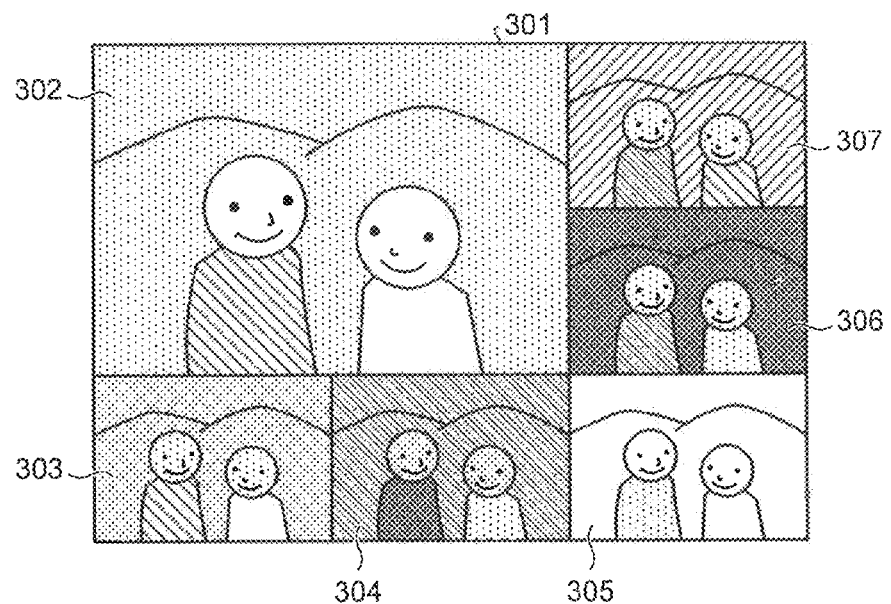
FIG. 15 illustrates another example of the layout change processing.

The embodiments of the present invention have been described above; however, the present invention is not limited to the two embodiments described above. In some embodiments, for example, it is possible to change a layout as illustrated in FIG. 15. A composite image 301 illustrated in FIG. 15 includes a main image 302 and five sub-images 303 to 307 that are smaller in size than the main image 302 and that are arranged so as to surround the bottom side and the right side of the main image 302.

Figure 16:
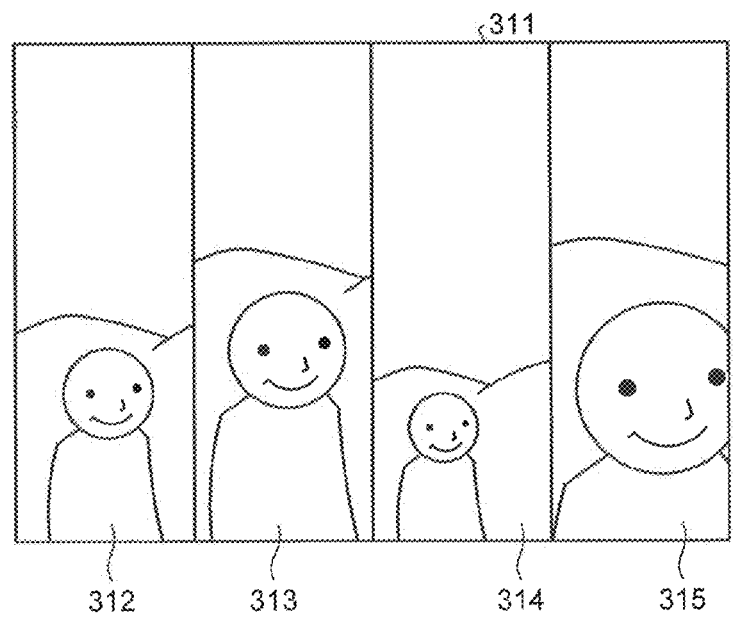
FIG. 16 illustrates a display example of divided sub-images with different magnifications.

Furthermore, in some embodiments, it is possible to change a magnification when an image is divided into sub-images for display. FIG. 16 illustrates a display example of this case. A composite image 311 illustrated in FIG. 16 contains four sub-images 312 to 315 that have different magnifications and that are arranged side by side. If any one of the sub-images 312 to 315 has the same magnification as that of an actually captured image, the sub-image corresponds to the main image.

Figure 17:
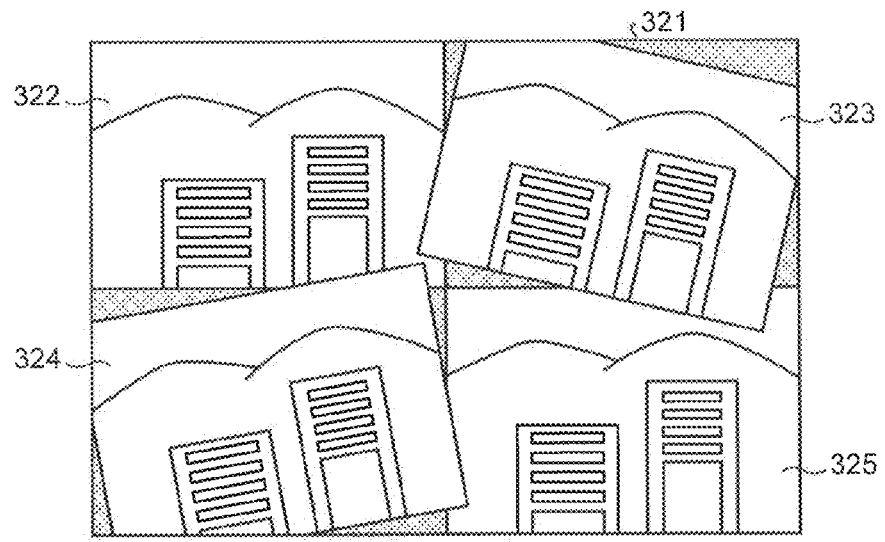
FIG. 17 illustrates a display example in which divided sub-images are arranged randomly.

Moreover, in some embodiments, the divided sub-images may be arranged randomly. FIG. 17 illustrates a display example of this case. A composite image 321 illustrated in FIG. 17 contains four sub-images 322 to 325 that are arranged randomly.

Figure 18:
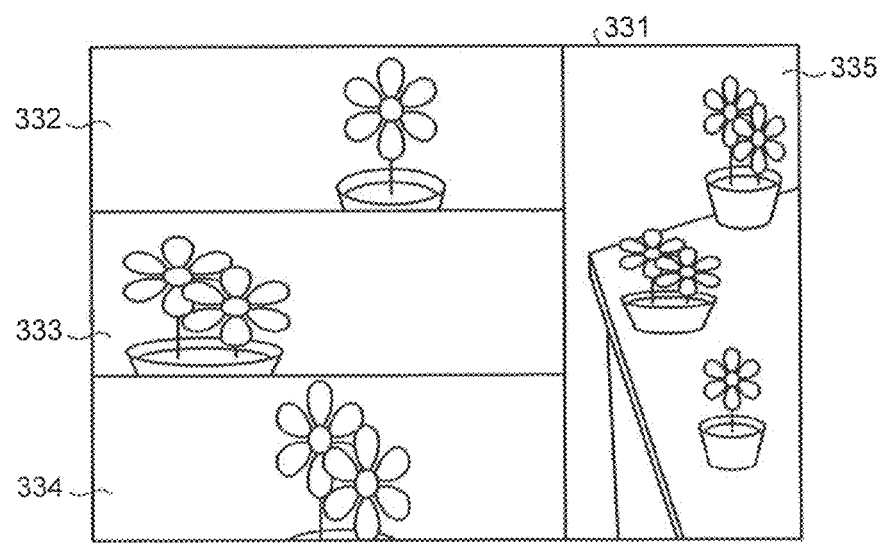
FIG. 18 illustrates a display example when sub-images are generated by separating a plurality of subjects contained in a single image.

Furthermore, in some embodiments, it is possible to generate sub-images by separating a plurality of subjects contained in one image. FIG. 18 illustrates a display example of this case. A composite image 331 illustrated in FIG. 18 includes three sub-images 332 to 334 and a main image 335 containing all subjects displayed in the sub-images 332 to 334. Such an image can be generated by providing a subject detector in the control unit.

Figure 19:
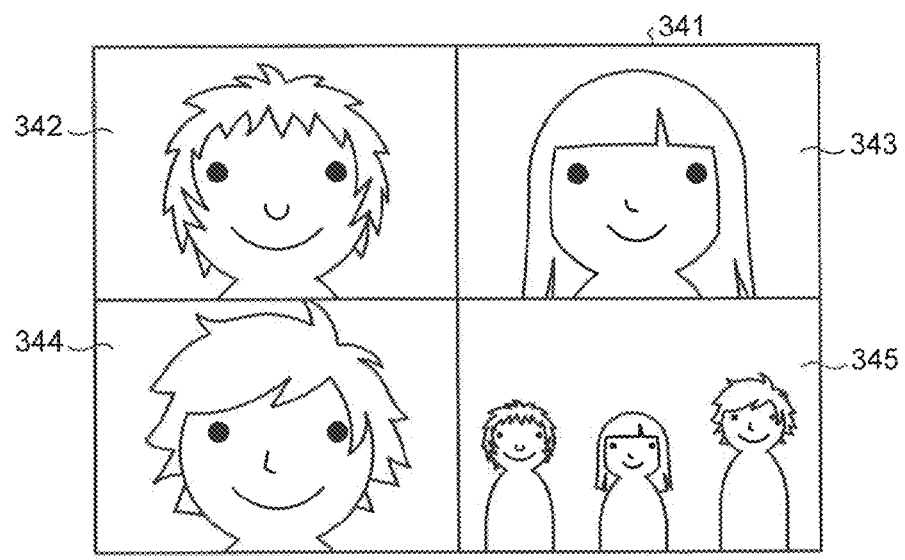
FIG. 19 illustrates a display example when sub-images each displaying one of persons contained in a single image are generated.

Moreover, in some embodiments, it is possible to generate sub-images each displaying one of persons contained in one image. FIG. 19 illustrates a display example of this case. A composite image 341 illustrated in FIG. 19 displays three sub-images 342 to 344 each showing one person and a main image 345 showing all of the persons.

Furthermore, in some embodiments, it is possible to allow a user to select an image by a method other than the touch operation. For example, the imaging apparatus may be configured to detect a brain wave or a line of sight of a user so that the imaging apparatus can detect the brain wave or the line of sight of the user and select an image based on the results of the detection.

Moreover, in some embodiments, the display screen of the display unit may be viewable by a spectacle device. In this case, an image is selected based on a line of sight of a user because it is difficult to select an image by a touch operation.

Furthermore, in some embodiments, it is possible to apply live view images as images of an image group for setting a main image and sub-images. In this case, it becomes possible to capture an image while checking a decisive moment of a subject. An image selected from the live view images as described above is preferably a still image in which the decisive moment is captured and a user can fully check a composition, colors, or image quality of the image according to the taste of the user. Moreover, the user can feel the satisfaction that he/she has captured an image of the decisive moment by selecting the image as described above.

Furthermore, in some embodiments, a pattern for combining a main image and sub-images may be set by a user through a touch operation or the like.

Moreover, in some embodiments, it is possible to form an image in a pattern that differs from a list display, as the composite image in which the main image and the sub-images are combined.

Furthermore, in some embodiments, it is preferable to display the main image so as to stand out from the sub-images. As an example of such a display, a layout may be employed in which the main image is displayed at a location where person's eyes tend to be focused based on ergonomics. Specifically, for example, it is possible to arrange the main image in the center and arrange the sub-images on the periphery. In this case, it is more preferable to increase the size of the main image than the sub-images so that the main image can further stand out from the sub-images. It may also be possible to change the shape of a rim of the main image so that the shape of the main image can further stand out from the sub-images.

In the above-described embodiments, features and methods are described as being performed by an imaging apparatus. However, the features and methods described above may be implemented in any appropriate combination of hardware and/or software. For example, one or more software programs may perform the features, processes and methods described herein. As one example, a computer may include a processor, a main memory unit (such as a RAM), and a computer-readable medium that stores one or more programs which, when executed by the processor, performs all or any combination of the features, processes and methods described herein. The computer-readable medium may be, for example, a magnetic disk, a magnetic optical disk, CD-ROM, DVD-ROM, or a semiconductor memory. The processor may read the one or more programs stored in the computer-readable storage medium, and execute the processes for generating composite images described above. The processor may store composite images in a computer-readable medium. The one or more programs may be received by the computer via one or more wired or wireless networks, and then stored in the computer-readable medium.

It is to be appreciated that numerous embodiments incorporating only part of the preferred embodiment herein are possible which do not alter, with respect to those parts, the inventive concepts and principles embodied therein. The present embodiments and optional configurations are therefore to be considered in all respects as exemplary and/or illustrative and not restrictive and all alternate embodiments and changes to this embodiment which come within the meaning and range of equivalency of said claims are therefore to be embraced therein. Accordingly, the invention in its broader aspects is not limited to the specific details and representative embodiments shown and described herein, and various modifications may be made without departing from the spirit or scope of the general inventive concept as defined by the appended claims and their equivalents.

What is claimed is:

1. An image processing method comprising:
capturing a plurality of images with an imaging apparatus and generating image data corresponding to the plurality of images;
performing image processing on the image data to generate image processed image data;
displaying the plurality of images on a display unit;
selecting a selected image from the plurality of images displayed on the display unit by a selection operation, the selected image including at least one image processed piece of image data;
selecting at least one sub-image from the image data, other than the selected image, such that the at least one sub-image is not identical to the selected image; and
generating a composite image comprised of the selected image and the at least one sub-image.

2. The image processing method of claim 1, further comprising displaying a list of the plurality of images.

3. The image processing method of claim 2, wherein the display pattern of the composite image is different from that of the list of the plurality of images.

4. The image processing method of claim 1, wherein the plurality of images are live view images before the selected image is selected.

5. The image processing method of claim 1, wherein the selection operation comprises a touch operation on a touch panel disposed on a display unit that is configured to receive a signal corresponding to the touch operation.

6. The image processing method of claim 1, further comprising selecting a display pattern for displaying the selected image and the at least one sub-image in a distinguishable manner.

7. The image processing method of claim 1, wherein the selected image and the at least one sub-image are simultaneously displayed in the composite image.

8. The image processing method of claim 7, wherein the selected image and the at least one sub-image are arranged in separate areas in the composite image.

9. The image processing method of claim 7, wherein the selected image is greater in size than the at least one sub-image in the composite image.

10. The image processing method of claim 7, wherein the at least one sub-image is superimposed on the selected image in the composite image.

11. The image processing method of claim 1, wherein performing image processing further comprises performing special effect processing on at least one of the plurality of images by performing at least one of a plurality of types of image processing to produce at least one visual effect image.

12. The image processing method of claim 11, wherein the at least one visual effect image is displayed in the composite image as the selected image or the at least one sub-image.

13. The image processing method of claim 1, wherein while generating the composite image, images captured before and after the selected image is captured are employed as the sub-images.

14. The image processing method of claim 13, wherein the selected image and the sub-images are displayed side by side in chronological order.

15. The image processing method of claim 1, wherein the sub-images have visual features or processing effects that make them distinguishable from the selected image.

16. A method for generating a composite image from a selected image and at least one sub-image comprising:
- capturing at least one image with an imaging apparatus and generating image data corresponding to the at least one captured image;
- performing image processing on the image data to generate at least one image processed piece of image data;
- selecting a selected image from the image data, including the at least one image processed piece of image data;
- selecting at least one sub-image from the image data, including the at least one image processed piece of image data, other than the selected image, the at least one sub-image is not identical to the selected image; and
- generating the composite image comprising the selected image and the at least one sub-image.

17. The method of claim 16, wherein the image processing comprises at least one of basic imaging processing and artistic effect image processing.

18. The method of claim 16, wherein the at least one sub-image is not identical to the selected image as a result of the image processing.

19. An image capture and processing apparatus comprising:
- an image capture unit for capturing a plurality of images;
- a display unit for displaying the plurality of images;
- an input unit for selecting a selected image from the plurality of images, the selected image including at least one processed piece of image data;
- an image processing unit for receiving a signal corresponding to the selected image and generating a composite image comprised of the selected image and at least one other image that is not identical to the selected image.

20. The image capture and processing apparatus of claim 19, wherein the input unit receives a signal corresponding to a selected display pattern for the composite image; and
- the display unit displays the composite image according to the selected display pattern.

21. The image capture and processing apparatus of claim 20, wherein the at least one other image is selected based on the selected display pattern.

* * * * *